2,898,371

STILBENE DICARBOXYLIC ACID AMIDES

Robert S. Long, Bound Brook, and Sien Moo Tsang, Middlesex, N.J., assignors to American Cyanamid Company, New York, N.Y., a corporation of Maine No Drawing. Application December 16, 1957
Serial No. 702,798

6 Claims. (Cl. 260—507)

This invention relates to intermediates for new dyes and, more specifically, it relates to new dye intermediates of the structure:

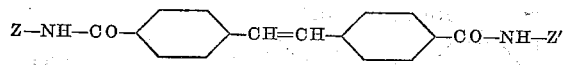

in which Z and Z' are carbocyclic aryl radicals of less than three six membered rings which are further substituted by at least one group selected from hydroxy, amino, acetoacetamino and 1-pyrazolyl. These compounds are coupling components from which new azo dyes can be prepared.

When azo dyes which contain a free amino group are condensed with the acid chloride of stilbene dicarboxylic acid, there are formed new azo dyes which have excellent substantivity for cellulosic fibers. It is a further advantage that these new dyes in general have excellent fastness to light and washing, often superior to available commercial types. These new azo dyes may be represented by the formula

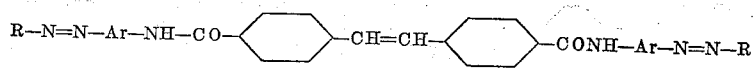

in which R and Ar are aromatic residues of not more than two rings.

The amino azo dyes which are to be reacted with stilbene dicarboxylic acid are prepared in several ways.

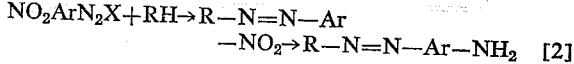

A diazotized amine can be coupled into an amino compound to form the aminoazo compound:

$$RN_2X + ArNH_2 \rightarrow R-N=N-Ar-NH_2 \quad [1]$$

Conversely, a nitroamine can be diazotized and coupled, followed by reduction of the nitro compound:

$$NO_2ArN_2X + RH \rightarrow R-N=N-Ar$$
$$-NO_2 \rightarrow R-N=N-Ar-NH_2 \quad [2]$$

or an acylamino group may be used in place of nitro, the acyl group being removed by hydrolysis after the coupling. The choice of route will depend on the structures of the R and Ar components. The aminoazo compound thus prepared is reacted with stilbene dicarbonyl chloride to form the dyes of this invention. These new azo dyes are claimed in our copending application, Serial No. 401,376, filed December 30, 1953, of which this application is a continuation in part.

Both of the carbocyclic aromatic residues which form the aminoazo compound can be either naphthalene or benzene derivatives. They can be further substituted by alkyl, alkoxy, hydroxy, halogen, amino, carboxy, or sulfonic groups. In carrying out the synthesis of the dyes of the present invention, an exceedingly wide range of compounds may be used, resulting in the production of numerous attractive shades in the finished product. For example, synthesis by Route 2 can utilize such nitroamines as 5-nitro-2-aminotoluene, 4-nitroaniline-2-sulfonic acid, 5-nitro-2-aminoanisole, 2-nitro-4-methyl-5-aminoanisole, 3-nitro-4-chloro-aniline, 4-nitro-2-amino-toluene, 4-nitro-2-aminoanisole, 6-nitro-4-amino-1,3-dimethylbenzene, 3-nitro-1-naphthylamine, 4-nitro-1-naphthylamine, 5-nitro-1-naphthylamine, 1-chlor-2-amino-4-nitronaphthalene. These can be coupled into the various naphtholsulfonic acids known to the art, into naphthols such as beta-naphthol, and into phenols, such as salicylic acid, phenol, cresols, resorcinol, and the like. They may also be coupled into naphthylamines such as 2-naphthylamine-5,7-disulfonic acid, gamma acid, or J acid in such a way that coupling is ortho to the amino group. By using Route 1, one can couple various diazo compounds such as those from aniline, toluidines, anisidines, aminosalicylic acids, and aminonaphthalene compounds such as H acid, amino G acid, K acid, Cassella's acid, gamma acid, and the like with aniline and naphthylamine derivatives.

It is a further advantage of these new azo dyes that when the starting materials are chosen so that metallizable groups (e.g., hydroxy, alkoxy, halogen, carboxy) are present ortho to the azo linkage in the aminoazo intermediate, it is possible, after condensation with stilbene dicarbonylchloride, to metallize the final dyestuffs to obtain very valuable dyes with excellent fastness properties.

Azo dyes of this general type may also be prepared by a third route. If the stilbene dicarboxylic acid is condensed with an aminophenol, an aminonaphthol, or a diamino benzene or naphthalene, the resultant amide can be used as a coupling component for diazotized amines and the products are also azo dyes of the type contemplated.

These coupling components are also new compounds and the specific embodiment of the present invention. They are derived from such aminophenols, aminonaphthols, and diamino compounds as m-aminophenol, m-phenylene diamine, m-toluylene diamine, 5-amino-2-naphthol, 8-amino-2-naphthol, J acid, gamma acid, H acid, Chicago acid, aminoacetoacetanilides, and aminophenylpyrazolones. These compounds all have in common not only the amino group to be acylated, but also a group which activates coupling of diazonium compounds such as amino or hydroxyl. This route to the azo dyes of our invention has an advantage over the other routes in that a number of different dyes can be readily prepared from one starting material. The products prepared by this route show excellent fastness to chlorine.

The stilbene dicarboxylic acid amides can be prepared by a variety of conventional methods. Thus, the stilbene dicarboxylic acid may be converted to the di-acid chloride by the use of phosphorus trichloride, phosphorus pentachloride, phosphorus oxychloride, thionyl chloride, or a similar agent. The acid chloride may then be reacted with two moles of the amine or aminoazo compound, in the presence of an inert solvent if necessary. A convenient method is to heat the dicarboxylic acid in an excess of thionyl chloride under reflux, to distill off the excess reagent, and to treat the acid chloride with the amine in pyridine at the boil. Still better, the dicarboxylic acid is reacted with only the theoretical amount of thionyl chloride by gentle warming in pyridine, and the amine is then added directly to the reaction mixture, which is then heated at the boiling point. An alternative method whereby one may isolate the acid chloride in pure form is to heat the dicarboxylic acid with the theoretical amount of thionyl chloride in an indifferent medium such as nitrobenzene; the acid chloride precipitates out and may be filtered off; it is then reacted with the amine as before.

Our invention can be illustrated by the following examples, in which parts are by weight unless otherwise specified.

*Example 1*

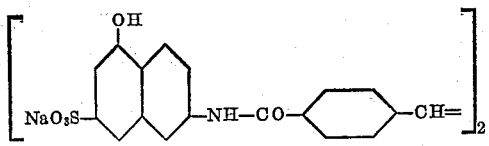

Stilbene-4,4'-dicarboxylic acid chloride is prepared by refluxing a mixture of 1.34 parts of stilbene-4,4'-dicarboxylic acid with 16.4 parts of thionyl chloride. After being stripped of excess thionyl chloride, the acid chloride is heated with a mixture of 3.92 parts of J acid as the sodium salt and 24.6 parts of dried pyridine at reflux for one hour. After being cooled to room temperature, the mixture is filtered. The diamide thus obtained is purified twice by recrystallization from the aqueous solution.

If 2-aminophenol-4-sulfonic acid is substituted in equivalent amount for the J acid, the corresponding diamide is obtained.

*Example 2*

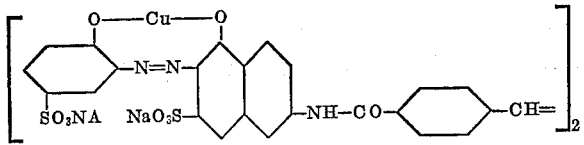

The diamide from Example 1, 1.43 parts, is dissolved in a solution of 1.2 parts of sodium carbonate in 10 parts of water. The resulting solution is cooled to 10° C. and treated with a slight excess of the diazo from 3-amino-4-methoxybenzene sulfonic acid which is obtained by the usual method of diazotization. The bisazo dye is separated by filtration. It dyes cotton a reddish orange shade.

The dye is metallized by heating with a mixture of 2.82 parts of copper sulfate, 10.2 parts of 15 N ammonium hydroxide solution and 40 parts of water at 85–90° C. for twenty-four hours. The metallized dye is separated by filtration. It dyes cotton in a bluish red shade with excellent light fastness.

*Example 3*

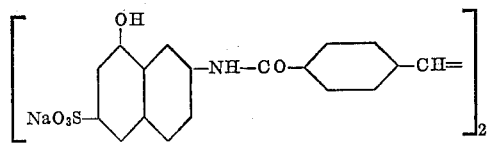

A mixture of 10.72 parts of stilbene-4,4'-dicarboxylic acid, 13.83 parts of thionyl chloride and 393 parts of dried pyridine is heated at 55° C. until the reaction is complete. Twenty-five parts of gamma acid is then added. The resulting mixture is heated at reflux until the reaction is substantially complete. It is drowned into 500 parts of water containing 100 parts of sodium chloride and 12 parts of sodium carbonate. After the removal of the pyridine by steam distillation, the mixture is clarified by filtration. When the mixture is cooled, the diamide separates. It is filtered, washed with 10% sodium chloride solution and dried.

*Example 4*

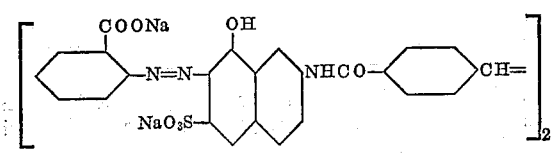

The dye is obtained by coupling 2.76 parts of the diamide with a slight excess anthranilic acid diazo at 10–15° C. in 80 parts of water containing 3.3 parts of sodium carbonate as the neutralizing agent. The dye is separated by salting with 10 parts of sodium chloride and isolated by filtration. It dyes cotton a scarlet shade which turns bluer on after-treatment with copper or chromium salt.

*Example 5*

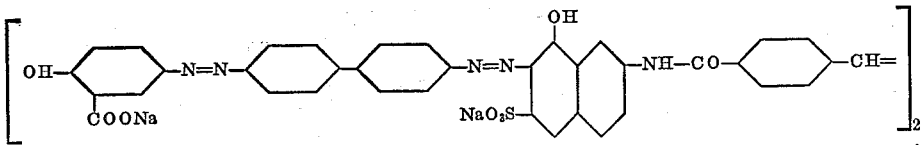

Benzidine tetrazo is prepared from 2.57 parts of benzidine dihydrochloride by the usual method of tetrazotization. It is coupled with 1.48 parts of salicyclic acid in about 80 parts of water with sodium carbonate as the neutralizing agent. To the resulting mixture a solution of 3.77 parts of the diamide from gamma acid (prepared as described in Example 5) in 150 parts of water and 19.6 parts of pyridine is added, with 1.06 parts of sodium carbonate present as the neutralizing agent. The reaction is effected at 10° C. The dye is separated by salting and filtering. It dyes cotton a reddish brown shade with good wash and light fastness.

*Example 6*

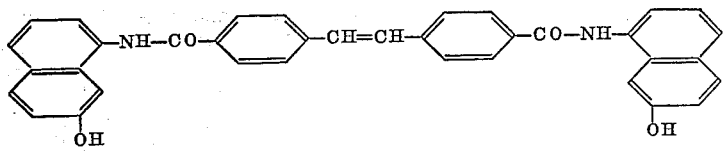

A mixture of 1 part of 4,4'-stilbene dicarboxylic acid, 20 parts of dry pyridine, and 0.89 part of thionyl chloride was heated with stirring at 50–55° C. until formation of the acid chloride was complete. The mixture was then refluxed with 1.31 parts of 1-amino-7-naphthol until the condensation was complete. A grey solid was precipitated by pouring the dark brown solution into 200 parts of water, and it was filtered off. The solid was taken up in 80 parts of ethanol and 7.6 parts of 5 N potassium hydroxide, and the solution was heated on the steam bath while gradually adding 100 parts of water. A small amount of sediment was filtered off and a curdy grey solid was obtained by acidifying the filtrate. It was isolated by filtration and purified by recrystallization from a pyridine-water mixture. A good yield was obtained of a tan solid, melting above 325° C., which gave a good analysis for the desired stilbene-4,4'-dicarboxy (7-hydroxynaphthylamide).

If an equivalent amount of 1(4'-aminophenyl)-3-methyl-5-pyrazoline, or p-aminoacetoacetanilide is used in place of the aminonaphthol the corresponding amides are obtained.

*Example 7*

The product of Example 6 was coupled on cotton cloth with a number of stabilized diazonium compounds of the type known as "fast bases." The following colors were obtained:

Fast base from: | Color
1-aminoanthraquinone | Pink.
5-nitro-p-anisidine | Bordeaux.
5-nitro-o-anisidine | Blue red.
Dianisidine | Blue.

*Example 8*

The procedure of Example 6 is used substituting 0.9 part of m-aminophenol for the 1-amino-7-naphthol. A good yield of stilbene-4,4'-dicarboxy-m-hydroxyanilide is obtained. This may be used to couple with "fast bases" in a manner similar to that used in Example 8.

*Example 9*

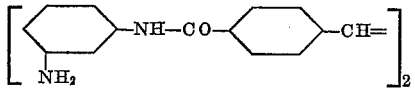

The procedure of Example 6 is followed using m-aminoacetanilide. The crude acetamido product, when heated with the caustic in ethanol is hydrolyzed to the free amine which precipitates and is purified by recrystallization from aqueous ethanol.

We claim:
1. Compounds having the structure:

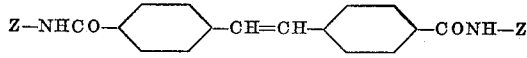

in which Z is a carbocyclic aryl radical of less than 3 six membered rings further substituted by at least one group selected from hydroxy, amino, acetoacetamido, and pyrazonyl.

2. Compounds according to claim 1 in which Z is a naphthalene residue.

3. Compounds according to claim 2 in which Z is sulfonated.

4. A compound having the formula:

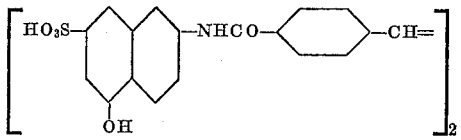

5. A compound having the formula:

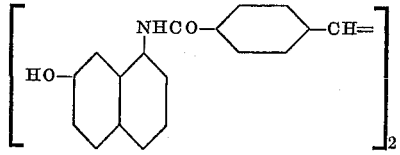

6. A compound having the formula:

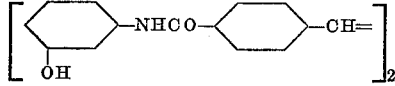

References Cited in the file of this patent

UNITED STATES PATENTS 2,521,665 Hausermann Sept. 5, 1950
2,567,796 Ackermann Sept. 11, 1951
2,688,617 Hein et al. Sept. 7, 1954